US010317762B2

(12) United States Patent
Yamazaki

(10) Patent No.: US 10,317,762 B2
(45) Date of Patent: Jun. 11, 2019

(54) ACTIVE MATRIX CIRCUIT SUBSTRATE, DISPLAY DEVICE, METHOD OF DRIVING DISPLAY DEVICE, AND ELECTRONIC APPARATUS

(71) Applicant: E Ink Corporation, Billerica, MA (US)

(72) Inventor: Katsunori Yamazaki, Matsumoto (JP)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 15/662,652

(22) Filed: Jul. 28, 2017

(65) Prior Publication Data

US 2018/0046006 A1 Feb. 15, 2018

(30) Foreign Application Priority Data

Aug. 10, 2016 (JP) ................................. 2016-158136

(51) Int. Cl.
| | | |
|---|---|---|
| *G09G 3/34* | (2006.01) | |
| *G02F 1/1368* | (2006.01) | |
| *G02F 1/1335* | (2006.01) | |
| *G02F 1/1345* | (2006.01) | |
| *G09F 9/40* | (2006.01) | |

(52) U.S. Cl.
CPC .......... *G02F 1/1368* (2013.01); *G02F 1/1345* (2013.01); *G02F 1/133528* (2013.01); *G09F 9/40* (2013.01); *G09G 3/344* (2013.01); *G09G 2300/0809* (2013.01); *G09G 2310/08* (2013.01)

(58) Field of Classification Search
None
See application file for complete search history.

(56) References Cited

U.S. PATENT DOCUMENTS

| | | | | |
|---|---|---|---|---|
| 6,958,744 B2* | 10/2005 | Nakamura | ........... | G09G 3/3614 |
| | | | | 345/100 |
| 2016/0140899 A1* | 5/2016 | Jeong | ................... | G09G 3/3225 |
| | | | | 345/212 |

FOREIGN PATENT DOCUMENTS

JP 2009-86402 A 4/2009

* cited by examiner

*Primary Examiner* — Joseph R Haley
(74) *Attorney, Agent, or Firm* — Zhen Bao

(57) ABSTRACT

An active matrix circuit substrate includes a first power supply line, a second power supply line, a third power supply line, a fourth power supply line, a first control line, and a second control line; a pixel electrode and a memory circuit; a common electrode that is electrically connected to the fourth power supply line; a capacitor that is provided between the third power supply line and the pixel electrode; a first switch circuit that is provided between the first power supply line and the pixel electrode and operates on the basis of an output of the memory circuit and a potential of the first control line; and a second switch circuit that is provided between the second power supply line and the pixel electrode and operates on the basis of the output of the memory circuit and a potential of the second control line.

17 Claims, 12 Drawing Sheets

ACTIVE MATRIX CIRCUIT SUBSTRATE, DISPLAY DEVICE, METHOD OF DRIVING DISPLAY DEVICE, AND ELECTRONIC APPARATUS

BACKGROUND

1. Technical Field

The present invention relates to an active matrix circuit substrate, a display device, a method of driving the display device, and an electronic apparatus.

2. Related Art

An electrophoretic display device is a display device that can display an image for a long time due to low power consumption. A device which includes a transistor for switching and a memory circuit in a pixel is known as the electrophoretic display device (refer to, for example, JP-A-2009-86402).

That is, the electrophoretic display device disclosed in JP-A-2009-86402 includes a scan line, a data line, a first control line, a second control line, a pixel electrode provided in a pixel, a pixel switching element and a memory circuit which are provided in the pixel, and a counter electrode facing the pixel electrode. An electrophoretic dispersion liquid is provided between the pixel electrode and the counter electrode, an electric field is generated between the pixel electrode and the counter electrode, and thereby, display is performed as a result of migration of electrophoretic particles in the electrophoretic dispersion liquid.

When display switching is performed, for example, in a state where a potential of the pixel electrode is constant, the electrophoretic display device performs driving for periodically displacing a potential of the counter electrode, thereby, generating a potential difference between the pixel electrode and the counter electrode. An electric field is generated by the potential difference, and thereby, switching of the display occurs as a result of migration of the electrophoretic particles.

Here, FIG. 10 is a timing chart illustrating a drive sequence of an electrophoretic display device in the related art.

When a potential Vpix(H) of the pixel electrode is set to 0 and a potential Vcom of the counter electrode is periodically switched between 0 and V, a potential difference Vpix(H)−Vcom between the pixel electrode and the counter electrode is periodically switched between 0 and V, in the timing chart illustrated in FIG. 10. Meanwhile, when a potential Vpix(L) of the pixel electrode is set to V and the potential Vcom of the counter electrode is periodically switched between 0 and V, a potential difference Vpix(L)−Vcom between the pixel electrode and the counter electrode is also periodically switched between 0 and V.

When a potential difference between a pixel electrode and a counter electrode is periodically switched as described above, electrophoretic particles can migrate during a period in which the potential difference between the pixel electrode and the counter electrode is V, while the electrophoretic particles do not migrate during a period in which the potential difference is zero. Accordingly, time is delayed for switching display as long as a period is included in which the potential difference is zero.

SUMMARY

An advantage of some aspects of the invention is that an active matrix circuit substrate, a display device, a method of driving the display device, which can switch display in a shorter time without increasing a voltage applied between electrodes, and an electronic apparatus having a high display switching speed are provided.

The advantage is achieved by the following aspects of the invention.

According to an aspect of the invention, there is provided an active matrix circuit substrate including a substrate that includes an image display unit including a pixel; a first power supply line, a second power supply line, a third power supply line, a fourth power supply line, a first control line, and a second control line; a pixel electrode and a memory circuit that are provided in correspondence with the pixel; a common electrode that is electrically connected to the fourth power supply line; a capacitor that is provided between the third power supply line and the pixel electrode; a first switch circuit that is provided between the first power supply line and the pixel electrode and operates on the basis of an output of the memory circuit and a potential of the first control line; and a second switch circuit that is provided between the second power supply line and the pixel electrode and operates on the basis of the output of the memory circuit and a potential of the second control line.

Accordingly, an active matrix circuit substrate is obtained which can perform display switching in a shorter time without increasing a voltage applied between electrodes when being applied to a display device.

In the active matrix circuit substrate according to the invention, it is preferable that the first control line and the second control line are one and the same.

Accordingly, one wire can be the first control line and the second control line, and thereby, the number of wires can be reduced and wiring the active matrix circuit substrate can be simplified.

In the active matrix circuit substrate according to the invention, it is preferable that at least one of the first switch circuit and the second switch circuit include a circuit that prevents a current from flowing in reverse.

Accordingly, it is possible to prevent switch circuits from being damaged.

In the active matrix circuit substrate according to the invention, it is preferable that the third power supply line and the fourth power supply line are one and the same.

Accordingly, one wire can be the third power supply line and the fourth power supply line, and thereby, the number of wires can be reduced and wiring the active matrix circuit substrate can be simplified.

In the active matrix circuit substrate according to the invention, it is preferable that the first switch circuit include a first P-type transistor and a second P-type transistor which are connected in series to each other, and the second switch circuit include a first N-type transistor and a second N-type transistor which are connected in series to each other.

Accordingly, operations of the first switch circuit and the second switch circuit are easily controlled, and thereby, a signal supplied to the pixel electrode or the capacitor is easily controlled.

The active matrix circuit substrate according to the invention may further include a scan line, a data line, and a pixel switching element that is provided in correspondence with the pixel and is provided between the scan line, the data line, and the memory circuit.

Accordingly, it is possible to perform an operation such that image data is input to the memory circuit on the basis of an image signal supplied from the data line.

According to another aspect of the invention, there is provided a display device including the active matrix circuit substrate according to the aspect of the invention, and an electro-optical material layer provided between the pixel electrode and the common electrode.

Accordingly, a display device is obtained which can reduce time required for migrating electrophoretic particles included in the electro-optical material layer without increasing a voltage applied between a pixel electrode and a common electrode and can perform display switching in a shorter time.

According to still another aspect of the invention, there is provided a method of driving the display device including causing the first switch circuit or the second switch circuit to be in a turn-off state before potentials change when a potential of the third power supply line and a potential of the fourth power supply line change into the same phase.

Accordingly, electrical energy can be supplied between a pixel electrode and a common electrode without discharging the electric energy accumulated in the capacitor. Accordingly, the time when a potential difference between the pixel electrode and the common electrode decreases to zero can be reduced or eliminated by using a relatively simple circuit configuration.

According to still another aspect of the invention, there is provided an electronic apparatus including the display device according to the aspect of the invention.

Accordingly, an electronic apparatus having a high display switching speed is obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of an active matrix circuit substrate, a display device, a method of driving the display device, and an electronic apparatus according to the present invention will be described with reference to the accompanying drawings.

First Embodiment

Display Device

First, a first embodiment of the invention will be described.

Figure 1:
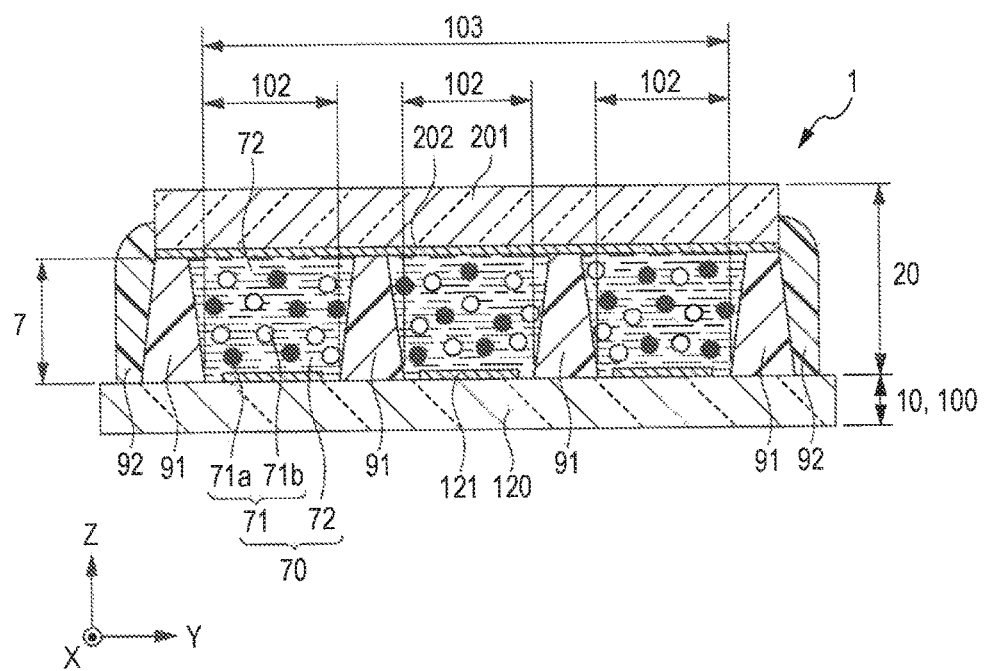
FIG. 1 is a sectional view illustrating an electrophoretic display device to which a first embodiment of a display device according to the invention is applied.

FIG. 1 is a sectional view illustrating an electrophoretic display device to which a first embodiment of a display device according to the invention is applied. In the following description, an upper side in FIG. 1 is referred to as "upper" and a lower side is referred to as "lower", for the sake of convenience of description. In addition, as illustrated in FIG. 1, two directions orthogonal to each other in a display surface of the electrophoretic display device 1 are referred to as an "X-axis direction" and a "Y-axis direction", and a direction orthogonal to the two directions is referred to as a "Z-axis direction".

The electrophoretic display device 1 illustrated in FIG. 1 is a display device which displays a desired image by using migration of particles. The electrophoretic display device 1 includes a backplane 10 including an electrode substrate 120 and a pixel electrode 121, and a front plane 20 including a counter substrate 201 and a common electrode 202.

Among those, the backplane 10 includes the electrode substrate 120 having a flat plate shape, a plurality of pixel electrodes 121 provided on an upper surface of the electrode substrate 120, and an electric circuit (not shown) provided on the electrode substrate 120. In the present specification, a device including the backplane 10 and the aforementioned common electrode 202 is also referred to as an active matrix circuit substrate 100. In addition, a region, where the pixel electrode 121, in the upper surface of the electrode substrate 120 is provided is particularly referred to as an "image display unit 103", and regions which include the pixel electrodes 121 of the image display unit 103 and are arranged in a matrix are referred to as "pixels 102".

Meanwhile, the front plane 20 includes the counter substrate 201 having a flat plate shape, the common electrode 202 provided on a lower surface of the counter substrate 201, and an electrophoretic material layer 7 (electro-optical material layer) which are provided below the common electrode 202 and filled with a dispersion liquid 70 including particles 71 and a dispersion medium 72.

In addition, the front plane 20 includes partition walls 91 which separate the electrode substrate 120 and the common electrode 202 from each other and isolate the pixels 102 from each other, and a sealing portion 92 which seals an outer edge side of the partition walls 91.

Hence, the electrophoretic display device 1 (display device) includes the active matrix circuit substrate 100 and an electrophoretic material layer 7 (electro-optical material layer) provided between the pixel electrode 121 and the common electrode 202.

Hereinafter, configurations of each portion will be sequentially explained.

Each of the electrode substrate 120 and the counter substrate 201 is a member having a sheet shape (flat plate shape). These may be either flexible members or rigid members.

Materials for forming of the electrode substrate 120 and the counter substrate 201 include, for example, various resin materials, various glass materials, and the like. Among these, the counter substrate 201 is specifically formed of a material having a light-transmitting property. Thereby, an upper surface of the counter substrate 201 illustrated in FIG. 1 becomes a display surface.

Elements, wires, and the like which are included in the electric circuit are formed of a conductive material in addition to the pixel electrode 121 and the common electrode 202. The conductive material includes, for example, various metal materials such as Al and Cu, various conductive polymer materials, various conductive oxide materials such as indium tin oxide (ITO) and indium zinc oxide (IZO), and the like. Among these, the common electrode 202 is specifically formed of a material with a light-transmitting property.

In addition, each of the materials which form the partition walls 91 and the sealing portion 92 includes, for example, any of various resin materials. The partition walls 91 may be provided if necessary, and may be omitted.

The dispersion liquid 70 includes the particles 71 and the dispersion medium 72.

In the present embodiment, an example will be described in which the particles 71 include two types of negatively charged black particles 71a and positively charged white particles 71b, and the dispersion medium 72 is transparent. That is, the dispersion liquid 70 according to the present embodiment includes the black particles 71a and the white particles 71b dispersed in the transparent dispersion medium 72. It is assumed that the particles 71 according to the present embodiment include both the black particles 71a and the white particles 71b.

The configuration of the dispersion liquid 70 is not limited to the aforementioned configuration. For example, the color exhibited by the particles 71 is not limited in particular, and may be a color other than black and white. In addition, the particles 71 may be formed of only one type of particles or may be formed of three or more types of particles having mutually different colors.

In addition, in a case where the particles 71 are formed of only one type of particles, the dispersion medium 72 may have a color different from the color of the particles 71. In this case, the color of the particles 71 is not limited in particular, and is preferably a dark color or black, for example, in a case where the dispersion medium 72 is a light color or white, and in contrast to this, the color is preferably a light color or white in a case where the dispersion medium 72 is a dark color or black.

The dispersion liquid 70 fills vesicular portions (corresponding to the pixels 102 described above) separately formed by the partition walls 91 described above and forms a part of the electrophoretic material layer 7.

For example, particles based on oxides such as titanium oxide, zinc oxide, iron oxide, chromium oxide, and zirconium oxide, particles based on nitrides such as silicon nitride and titanium nitride, particles based on sulfides such as zinc sulfide, particles based on borides such as titanium boride, particles of inorganic pigments such as strontium chromate, cobalt aluminate, chromium copper, and ultramarine, particles of organic pigments such as those of the azo type, quinacridone type, anthraquinone type, dioxazine type, and perylene type, or the like can be used as the particles 71. In addition, composite particles in which pigments are coated on surfaces of resin particles formed of acryl-based resin, urethane-based resin, urea-based resin, epoxy-based resin, polystyrene, polyester or the like can also be used as the particles 71.

In addition, the particles 71 may be particles obtained by performing various surface treatments on the surfaces of the aforementioned particles.

A liquid with a boiling point of 100° C. and a high insulating property is preferably used as the dispersion medium 72. Specifically, for example, various types of water, alcohols such as butanol or glycerin, cellosolves such as butyl cellosolve, esters such as butyl acetate, ketones such as dibutyl ketone, aliphatic hydrocarbons such as pentane (liquid paraffin), alicyclic hydrocarbons such as cyclohexane, aromatic hydrocarbons such as xylene, halogenated hydrocarbons such as methylene chloride, aromatic heterocyclic compounds such as pyridine, nitriles such as acetonitrile, amides such as N, N-dimethylformamide, carboxylate, silicone oil or other various oils, and the like can be used as the dispersion medium 72, and these can be used alone or as a mixture.

A plurality of microcapsules may be arranged between the electrode substrate 120 and the common electrode 202 without forming the partition walls 91, and the dispersion liquid 70 may be filled in the microcapsules. That is, the electrophoretic material layer 7 may be formed by arranging the microcapsules in a sheet form.

For example, gelatin, a composite material of gelatin and arabic gum, urethane-based resin, melamine-based resin, urea resin, epoxy-based resin, phenol-based resin, acryl-based resin, olefin-based resin, various resin materials such as polyamide and polyether, or the like can be used as a material for forming the microcapsule, and among these, one kind or two or more kinds combined together can be used.

Active Matrix Circuit Substrate

Next, a first embodiment of the active matrix circuit substrate according to the invention will be described.

Figure 2:
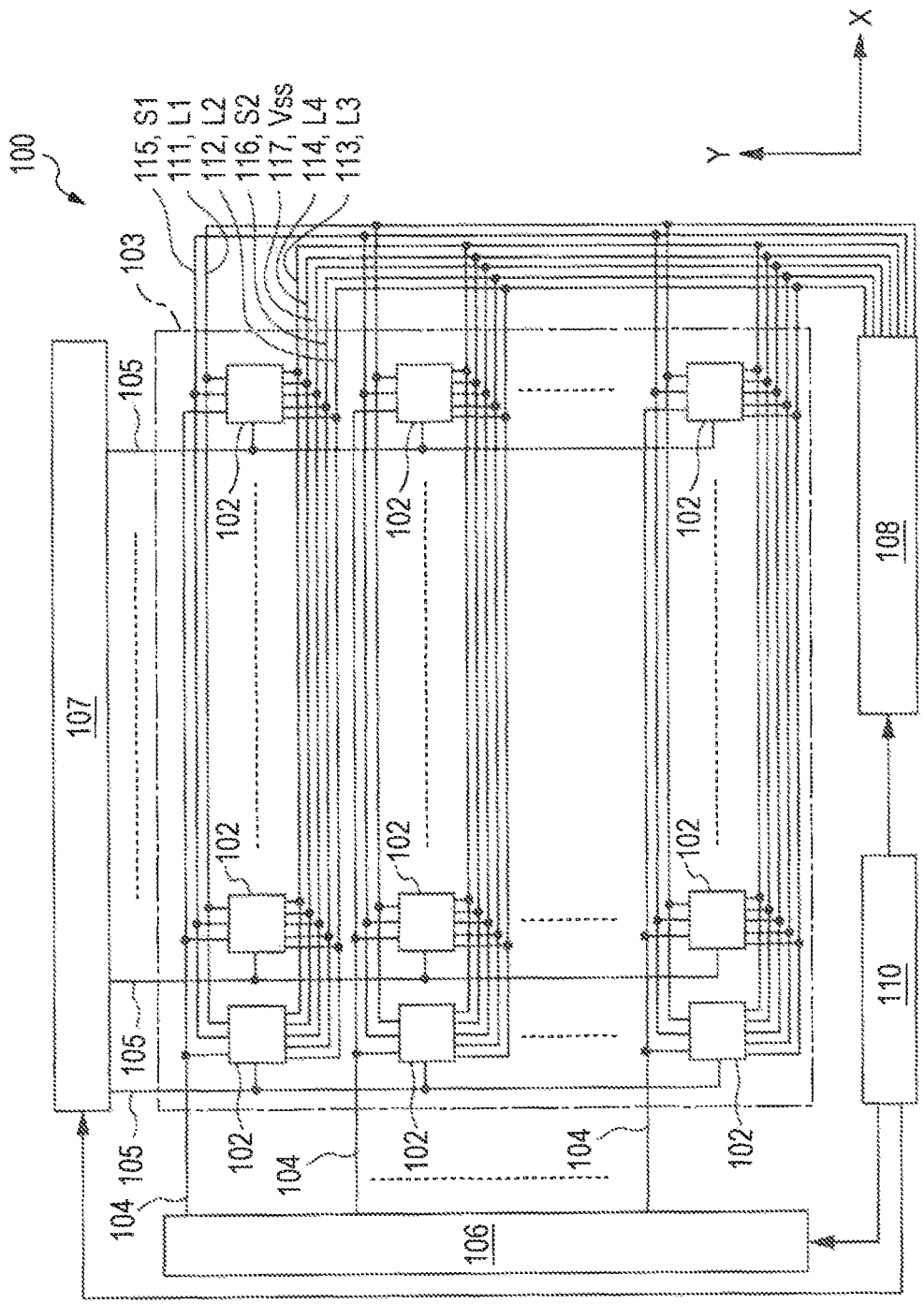
FIG. 2 is a block diagram illustrating a first embodiment of an active matrix circuit substrate according to the invention.
Figure 3:
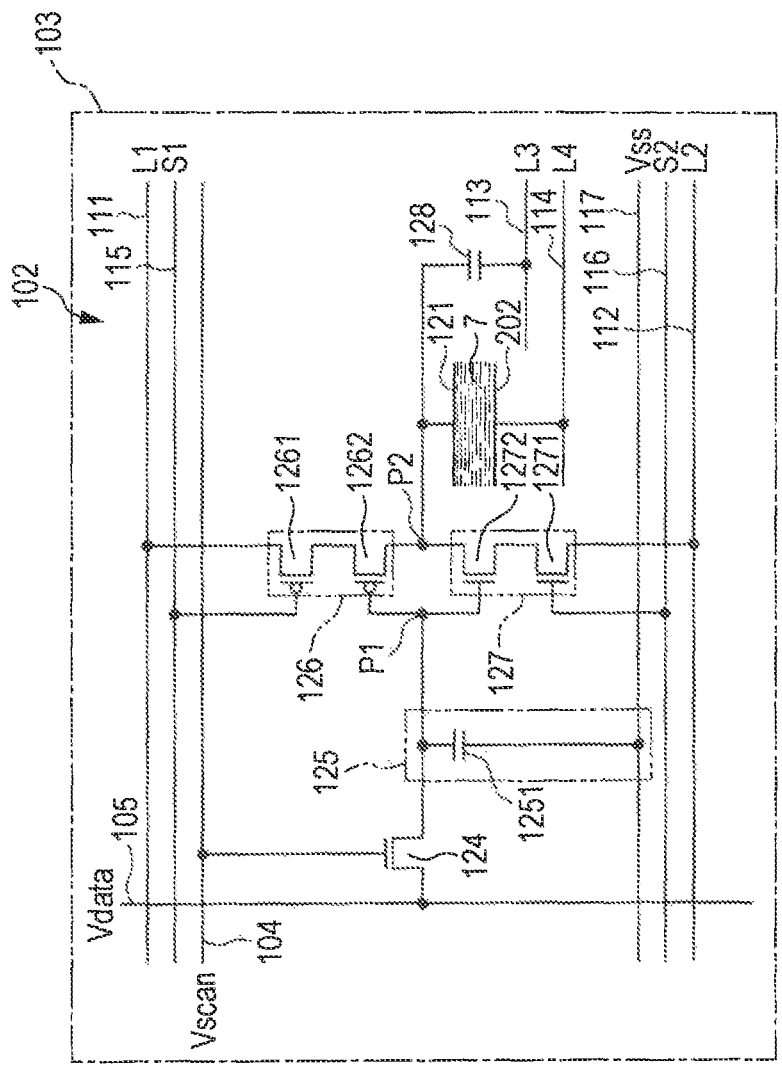
FIG. 3 is a diagram illustrating a circuit configuration of one pixel in the active matrix circuit substrate illustrated in FIG. 2.

FIG. 2 is a block diagram illustrating the first embodiment of the active matrix circuit substrate according to the invention. FIG. 3 is a diagram illustrating a circuit configuration of one pixel in the active matrix circuit substrate illustrated in FIG. 2.

The active matrix circuit substrate 100 illustrated in FIG. 2 includes an image display unit 103 in which a plurality of pixels 102 are arranged in a matrix, a scan line drive circuit 106 provided around the image display unit 103, a data line drive circuit 107, a common power supply modulation circuit 108, and a control unit 110.

A plurality of scan lines 104 (Vscan) extend in the X-axis direction in the image display unit 103. Meanwhile, a plurality of data lines 105 (Vdata) extend in the Y-axis direction in the image display unit 103. Each of the pixels 102 is provided near an intersection between the scan line 104 and the data line 105.

In addition, a first power supply line 111 (L1), a second power supply line 112 (L2), a third power supply line 113 (L3), a fourth power supply line 114 (L4), a first control line 115 (S1), a second control line 116 (S2), and a constant potential line 117 (Vss) are provided as wires common to all the pixels 102.

In addition, the common electrode 202 illustrated in FIG. 3 is provided as a common electrode for all the pixels 102.

The pixel 102 illustrated in FIG. 3 includes a drive TFT 124 (pixel switching element), a memory circuit 125, a first switch circuit 126, a second switch circuit 127, the pixel electrode 121, the common electrode 202, the electrophoretic material layer 7 provided between the pixel electrode 121 and the common electrode 202, and a capacitor 128. These are provided in correspondence with the individual pixels 102. The TFT is a thin film transistor.

The electrophoretic material layer 7 is interposed between the pixel electrode 121 and the common electrode 202, and the particles 71 migrate in accordance with an electric field generated by a potential difference generated therebetween, and thereby an image is displayed on the display surface. That is, the charged particles 71 migrate in accordance with a polarity of electric charges of the particles 71 and a direction of the electric field. For example, if the potential of the pixel electrode 121 is set to be higher than the potential of the common electrode 202, an electric field is generated from the pixel electrode 121 toward the common electrode 202, and thereby, the positively charged white particles 71b migrate to the common electrodes 202 side and the negatively charged black particles 71a migrate to the pixel electrode 121 side. In the present embodiment, since the display surface is set on the counter substrate 201 side, white is displayed on the display surface due to migration of the particles 71. Meanwhile, if the potential of the pixel electrode 121 is set to be lower than the potential of the common electrode 202, an electric field is generated from the common electrode 202 toward the pixel electrode 121, and thereby, the positively charged white particles 71b migrate to the pixel electrode 121 side and the negatively charged black particles 71a migrate to the common electrode 202 side. Thereby, black is displayed on the display surface.

Here, the wires provided in the pixel 102 will be described.

As illustrated in FIG. 3, the pixel 102 includes the scan line 104, the data line 105, the first power supply line 111, the second power supply line 112, the third power supply line 113, the fourth power supply line 114, the first control line 115, the second control line 116, and the constant potential line 117.

Among those, the scan line 104 supplies a selection signal defining an ON timing of the drive TFT 124.

In addition, the data line 105 supplies an image signal defining image data d of one bit.

In the present embodiment, it is assumed that the image signal of a low level (low potential) is supplied in a case where the image data d is defined as "0", and the image signal of a high level (high potential) is supplied in a case where the image data d is defined as "1".

Hence, the active matrix circuit substrate 100 includes the scan line 104, the data line 105, and the drive TFT 124 (pixel switching element) provided between the scan line 104 and the data line 105 which are provided in correspondence with the pixel 102, and the memory circuit 125, thereby, being able to operate such that the image data d based on the image signal supplied from the data line 105 is input to the memory circuit 125.

In addition, the first power supply line 111 supplies a drive signal which makes the particles 71 migrate to the pixel electrode 121 through the first switch circuit 126.

Meanwhile, the second power supply line 112 supplies a drive signal which makes the particles 71 migrate to the pixel electrode 121 through the second switch circuit 127.

In the present embodiment, it is assumed that a potential of V is supplied from the first power supply line 111 as the drive signal and a potential of 0 [V] is supplied from the second power supply line 112 as the drive signal, as an example.

In addition, the fourth power supply line 114 is connected to the common electrode 202, and supplies a common potential signal to the common electrode 202.

In the present embodiment, it is assumed that the common potential signal having a pulse waveform having a binary potential of 0 [V] and V is supplied from the fourth power supply line 114. In other words, a lower potential of the binary potential supplied to the fourth power supply line 114 is set as a reference, that is, 0 [V], as an example.

In addition, the third power supply line 113 is connected to the pixel electrode 121 through the capacitor 128. That is, the capacitor 128 is provided between the third power supply line 113 and the pixel electrode 121. A potential difference is generated between the third power supply line 113 and the pixel electrode 121 and charges the capacitor 128.

In the present embodiment, it is assumed that the same signal as a signal in the fourth power supply line 114 is supplied from the third power supply line 113 as an example.

In addition, the first control line 115 supplies a control signal which controls an operation of the first switch circuit 126.

In the present embodiment, it is assumed that a first control signal $\phi 1$ having a binary value of a low level (low potential) and a high level (high potential) is supplied from the first control line 115, as an example.

The second control line 116 supplies a control signal which controls an operation of the second switch circuit 127.

In the present embodiment, it is assumed that a second control signal $\phi 2$ having a binary value of a low level (low potential) and a high level (high potential) is supplied from the second control line 116, as an example.

In addition, the constant potential line 117 supplies a potential signal on the low potential side to the memory circuit 125. Specifically, the image data d based on the image signal supplied from the data line 105 is a potential signal on the high potential side of the memory circuit 125, and a potential of the constant potential line 117 is set such that the image signal in the aforementioned state is stored in the memory circuit 125.

In the present embodiment, it is assumed that the constant potential line 117 is 0 [V] as an example.

Next, a circuit and the like provided in the image display unit 103 will be described.

The drive TFT 124 is, for example, an N-type Metal Oxide Semiconductor (MOS) transistor. A gate electrode of the drive TFT 124 is connected to the scan line 104, a source electrode is connected to the data line 105, and a drain electrode is connected to an input terminal of the memory circuit 125.

The memory circuit 125 includes a capacitor 1251 provided between the drain electrode of the drive TFT 124 and the constant potential line 117.

The memory circuit 125 according to the present embodiment is a one-input and one-output memory circuit which can store image data of one bit. Although the drive TFT 124 is in a turn-off state, the stored image data is maintained in the memory circuit 125. The stored image data is supplied to a common input terminal P1 of the first switch circuit 126 and the second switch circuit 127.

The first switch circuit 126 includes a first P-type MOS transistor 1261 and a second P-type MOS transistor 1262 connected in series to each other. Specifically, a source electrode of the first P-type MOS transistor 1261 is connected to the first power supply line 111, a drain electrode thereof is connected to a source electrode of the second P-type MOS transistor 1262, and a gate electrode thereof is connected to the first control line 115. In addition, a drain electrode of the second P-type MOS transistor 1262 is connected to a common output terminal P2 of the first switch circuit 126 and the second switch circuit 127, and a gate electrode thereof is connected to the common input terminal P1.

The second switch circuit 127 includes a first N-type MOS transistor 1271 and a second N-type MOS transistor 1272 connected in series to each other. Specifically, a source electrode of the first N-type MOS transistor 1271 is connected to the second power supply line 112, a drain electrode thereof is connected to a source electrode of the second N-type MOS transistor 1272, and a gate electrode thereof is connected to the second control line 116. A drain electrode of the second N-type MOS transistor 1272 is connected to the common output terminal P2, and a gate electrode thereof is connected to the common input terminal P1.

The pixel electrode 121 is connected to the common output terminal P2. Meanwhile, the common electrode 202 is connected to the fourth power supply line 114. The electrophoretic material layer 7 is provided between the pixel electrode 121 and the common electrode 202.

In addition, the capacitor 128 is provided between the common output terminal P2 and the third power supply line 113.

As described above, the active matrix circuit substrate 100 includes the electrode substrate 120 (substrate) including the image display unit 103 including the pixels 102, the first power supply line 111, the second power supply line 112, the third power supply line 113, the fourth power supply line 114, the first control line 115, the second control line 116, the pixel electrode 121 and the memory circuit 125 which are provided in correspondence with the pixel 102, the capacitor 128 provided between the third power supply line 113 and the pixel electrode 121, the first switch circuit 126 which is provided between the first power supply line 111 and the pixel electrode 121 and operates on the basis of an output of the memory circuit 125 and a potential of the first control line 115, and the second switch circuit 127 which is provided between the second power supply line 112 and the pixel electrode 121 and operates on the basis of the output of the memory circuit 125 and a potential of the second control line 116.

Next, a circuit and the like provided around the image display unit 103 will be described.

The scan line drive circuit 106 is connected to the plurality of scan lines 104, and supplies a selection signal defining an ON timing of the drive TFT 124 to the gate electrode of the drive TFT 124 through the scan line 104.

In addition, the data line drive circuit 107 is connected to the plurality of data lines 105, and supplies an image signal defining the image data of one bit to the source electrode of the drive TFT 124 through the data line 105.

In addition, the common power supply modulation circuit 108 is connected to the first power supply line 111, the second power supply line 112, the third power supply line 113, the fourth power supply line 114, the first control line 115, the second control line 116, and the constant potential line 117, and electrically connects or disconnects the respective lines.

Operations of the scan line drive circuit 106, the data line drive circuit 107, and the common power supply modulation circuit 108 are controlled by the control unit 110. Specifically, the control unit 110 controls the operations of the scan line drive circuit 106, the data line drive circuit 107, and the common power supply modulation circuit 108 on the basis of a signal input from an external high-order control device (not illustrated).

Method of Driving Display Device

Next, a first embodiment of a method of driving the display device according to the invention will be described.

Figure 4:
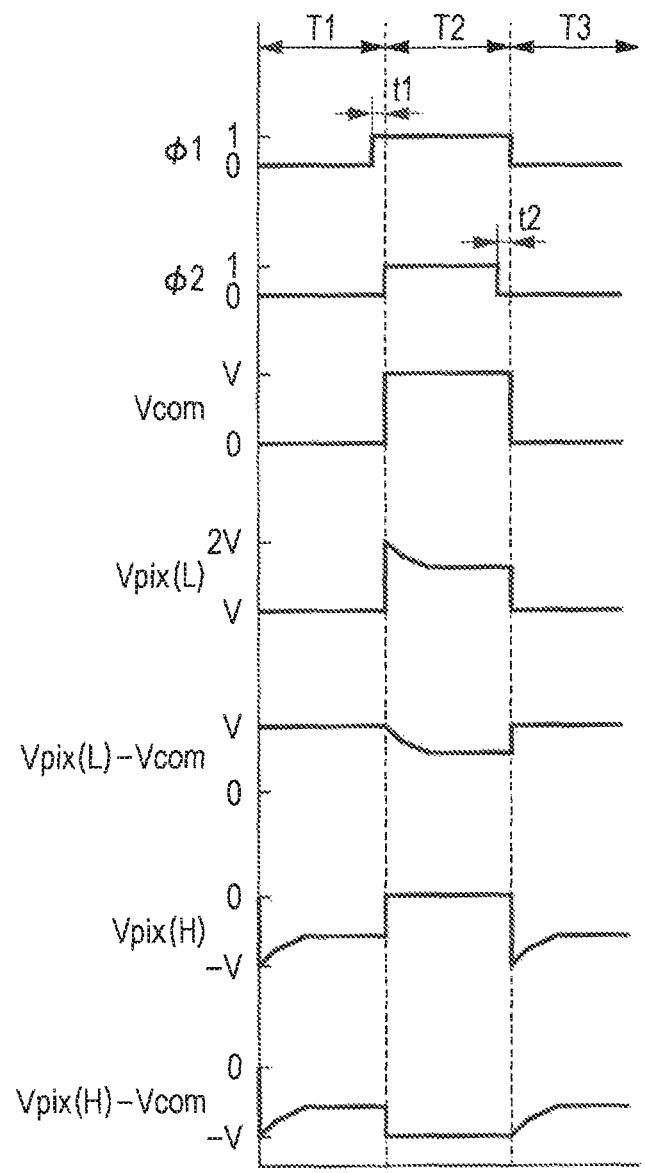
FIG. 4 is a timing chart illustrating a first embodiment of a method of driving the display device according to the invention.

FIG. 4 is a timing chart illustrating a first embodiment of the method of driving the display device according to the invention.

As illustrated in FIG. 4, in the driving method according to the present embodiment, on switching the display, the drive TFT 124 is first turned on and an image signal is supplied from the data line 105. Thereby, the image data d is stored in the memory circuit 125. Since the image data d stored in the memory circuit 125 is maintained as is although the drive TFT 124 is turned off, a periodic refreshing operation is not required in the display of the electrophoretic display device 1. Thereby, it is possible to reduce power consumption.

Next, as illustrated in FIG. 4, a common potential signal Vcom of a pulse waveform having binary potentials of 0 [V] and V is supplied to the common electrode 202. Here, a potential V on a high potential side is generally set to 5 V or higher to approximately 20 V or less.

In addition, when the common potential signal Vcom is supplied, a potential of V is applied to the first power supply line 111 and a potential of 0 [V] is applied to the second power supply line 112.

Here, in a case where the image data d supplied from the memory circuit 125 to the first switch circuit 126 is "0" and the first control signal ϕ1 supplied from the first control line 115 to the first switch circuit 126 is at a low level (0 in FIG. 4), the first switch circuit 126 enters a turn-on state. In a case where the image data d is "1" or the first control signal ϕ1 is at a high level (1 in FIG. 4), the first switch circuit 126 enters a turn-off state.

In addition, in a case where the image data d supplied from the memory circuit 125 to the second switch circuit 127 is "1" and the second control signal ϕ2 supplied from the second control line 116 to the second switch circuit 127 is at a high level (1 in FIG. 4), the second switch circuit 127 enters a turn-on state. In a case where the image data d is "0" or the second control signal ϕ2 is at a low level (0 in FIG. 4), the second switch circuit 127 enters a turn-off state.

Hence, hereinafter, the case where the image data d is "0" and the case the image data d is "1" will be separately described.

First, with respect to the case where the image data d is "0", a flow of a signal will be described when a transition occurs from a period in which the common potential signal Vcom is 0 [V] to a period in which the common potential signal is V.

In a case where the image data d is "0", since the second switch circuit 127 is in a turn-off state, the first control signal ϕ1 of a low level is supplied during a period T1 when the common potential signal Vcom is 0 [V], and thereby, the first switch circuit 126 enters a turn-on state. Accordingly, the common output terminal P2 is electrically connected to the first power supply line 111. Accordingly, the drive signal Vpix(L) of the potential of V is supplied from the first power supply line 111 to the pixel electrode 121 through the first switch circuit 126 and the common output terminal P2 as illustrated in FIG. 4.

At this time, since the potential of the common electrode 202 is 0 [V], a potential difference Vpix(L)–Vcom of a magnitude V is generated between the pixel electrode 121 and the common electrode 202. The particles 71 included in the electrophoretic material layer 7 migrate in accordance with an electric field generated by the potential difference Vpix(L)–Vcom. In addition, at the same time, the same potential difference is also generated between the terminals of the capacitor 128, and thereby, the capacitor 128 is charged by the potential difference of the magnitude V, and a terminal on the pixel electrode 121 side becomes a high potential side.

Next, before the common potential signal Vcom changes from 0 [V] to V (before a boundary between the period T1 and the period T2), the first control signal φ1 is changed to a high level. Thereby, the first switch circuit 126 enters a turn-off state. At this time, the second switch circuit 127 also enters a turn-off state, and thereby, the drive signal Vpix(L) of the pixel electrode 121 is pulled up by the capacitor 128 to be 2V as illustrated in FIG. 4.

Meanwhile, at substantially the same time as this, a transition occurs from the period T1 to the period T2, and thereby, both the common potential signal Vcom and a signal supplied to the third power supply line 113 become V, and a potential of the pixel electrode 121 at the time of referring to a potential of the common electrode 202 becomes +V. That is, the potential difference Vpix(L)–Vcom between the drive signal Vpix(L) of the pixel electrode 121 and the common potential signal Vcom becomes V (the pixel electrode 121 is on the high potential side) as illustrated in FIG. 4. The particles 71 migrate in accordance with an electric field generated by the potential difference Vpix (L)–Vcom. Since energy required for the migration is covered by the electric energy accumulated in the capacitor 128, the potential difference between the terminals of the capacitor 128 gradually decreases in accordance with discharge, and accordingly, the drive signal Vpix(L) of the pixel electrode 121 also gradually decreases from 2V as illustrated in FIG. 4. Accordingly, although the potential difference Vpix(L) –Vcom also gradually decreases from V, the particles 71 can migrate during this period.

The timing at which the first control signal φ1 is changed to a high level may be a timing just before the common potential signal Vcom changes from 0 [V] to V, and the length (period t1 in FIG. 4) of shift of the timing is not limited in particular. As an example, it is preferable that the length be approximately 1/1000 to approximately 1/10 of a half cycle of a pulse waveform of the common potential signal Vcom.

Next, since a transition occurs during a period T3 but the same behavior as in the aforementioned period T1 occurs during the period T3, a potential difference of the magnitude V is again generated between the pixel electrode 121 and the common electrode 202, and the particles 71 included in the electrophoretic material layer 7 migrate in accordance with the electric field generated by the potential difference. Thereafter, the behavior during the period T2 and the behavior during the period T1 are repeated.

Subsequently, in a case where the image data d is "1", a flow of a signal when a transition occurs from a period in which the common potential signal Vcom is V to a period in which the common potential signal is 0 [V] will be described.

In a case where the image data d is "1", since the first switch circuit 126 is in a turn-off state, the second control signal φ2 of a high level is supplied during the period T2 in which the common potential signal Vcom is V, and thereby, the second switch circuit 127 enters a turn-on state. Accordingly, the common output terminal P2 is electrically connected to the second power supply line 112. Accordingly, a drive signal Vpix(H) of 0 [V] is supplied from the second power supply line 112 to the pixel electrode 121 through the second switch circuit 127 and the common output terminal P2 as illustrated in FIG. 4.

At this time, since a potential of the common electrode 202 is V, a potential difference of a magnitude V is generated between the pixel electrode 121 and the common electrode 202. The particles 71 included in the electrophoretic material layer 7 migrate in accordance with an electric field generated by the potential difference. In addition, at the same time, the same potential difference is also generated between the terminals of the capacitor 128, and thereby, the capacitor 128 is charged by the potential difference of the magnitude V, and a terminal on the pixel electrode 121 side becomes a low potential side.

Next, before the common potential signal Vcom changes from V to 0 [V] (before a boundary between the period T2 and the period T3), the second control signal φ2 is changed to a low level. Thereby, the second switch circuit 127 enters a turn-off state. At this time, the first switch circuit 126 also enters a turn-off state, and thereby, the drive signal Vpix(H) of the pixel electrode 121 is pulled down by the capacitor 128 to be −V as illustrated in FIG. 4.

Meanwhile, at substantially the same time as this, a transition occurs from the period T2 to the period T3, and thereby, both the common potential signal Vcom and a signal supplied to the third power supply line 113 become 0 [V], and a potential of the pixel electrode 121 at the time of referring to a potential of the common electrode 202 becomes −V. That is, the potential difference Vpix(H)–Vcom between the drive signal Vpix(H) of the pixel electrode 121 and the common potential signal Vcom becomes V (the pixel electrode 121 side becomes a low potential side) as illustrated in FIG. 4. The particles 71 migrate in accordance with an electric field generated by the potential difference Vpix(H)–Vcom. Since energy required for the migration is covered by the electric energy accumulated in the capacitor 128, the potential difference between the terminals of the capacitor 128 gradually decreases in accordance with discharge, and accordingly, the drive signal Vpix(H) of the pixel electrode 121 also gradually increases from −V as illustrated in FIG. 4. Accordingly, although the potential difference Vpix(H)–Vcom also gradually decreases from V, the particles 71 can migrate during this period.

The timing at which the second control signal φ2 is changed to a low level may be a timing just before the common potential signal Vcom changes from V to 0 [V], and the length (period t2 in FIG. 4) of shift of the timing is not limited in particular. As an example, it is preferable that the length be approximately 1/1000 to approximately 1/10 of a half cycle of a pulse waveform of the common potential signal Vcom.

Next, since a transition occurs during a period not illustrated but the same behavior as in the aforementioned period T2 occurs during the period not illustrated, a potential difference of the magnitude V is again generated between the pixel electrode 121 and the common electrode 202, and the particles 71 included in the electrophoretic material layer 7 migrate in accordance with the electric field generated by the potential difference. Thereafter, the behavior during the period T3 and the behavior during the period T2 are repeated.

As described above, according to the present embodiment, it is possible to maintain a potential difference larger than zero between the pixel electrode 121 and the common electrode 202. Thereby, it is possible to reduce a period in which the particles 71 do not migrate. Accordingly, the electrophoretic display device 1 is obtained which can reduce time required for migrating the particles 71 without increasing a voltage applied between the pixel electrode 121 and the common electrode 202 and can perform display switching in a shorter time. In addition, in contrast, it is possible to lower the voltage applied between the pixel electrode 121 and the common electrode 202 without increasing the time required for display switching, and thereby, power consumption of the electrophoretic display device 1 can be reduced.

In addition, in a method of driving the display device according to the present embodiment, the potential of the third power supply line 113 and the potential of the fourth power supply line 114 are changed in the same phase, that is, since the same signal is supplied from both the third power supply line 113 and the fourth power supply line 114, the first switch circuit 126 or the second switch circuit 127 is driven to be in the turn-off state before the potential changes as described above. Thereby, electrical energy can be supplied between the pixel electrode 121 and the common electrode 202 without discharging the electric energy accumulated in the capacitor 128, thereby, being used for migration of the particles 71. Accordingly, the time when the potential difference between the pixel electrode 121 and the common electrode 202 decreases to zero can be reduced or eliminated by using a relatively simple circuit configuration.

In the above description, an example in which the same signal as in the fourth power supply line 114 is supplied from the third power supply line 113 is described. In this case, the third power supply line 113 and the fourth power supply line 114 may be shared. Thereby, since one wire can be the third power supply line 113 and the fourth power supply line 114, the number of wires can be reduced. Accordingly, it is possible to simplify the wires of the active matrix circuit substrate 100.

Meanwhile, a signal different from a signal in the fourth power supply line 114 may be supplied from the third power supply line 113. For example, the different signal may be a signal that changes in the same phase as the signal of the fourth power supply line 114. Hence, an amplitude of a waveform of the signal may be different, there may be a potential difference in the waveform of the signal, and a change timing may be slightly shifted.

The fact that there is a potential difference between waveforms of a signal means that a signal of a pulse waveform having binary potentials of, for example, 3 [V] and 3+V [V] is supplied from the third power supply line 113, in a case where a common potential signal of a pulse waveform supplied from the fourth power supply line 114 is a signal having binary potentials of 0 [V] and V.

In addition, for example, by increasing an amplitude of the waveform of the signal, the potential difference between the pixel electrode 121 and the common electrode 202 can be increased during a period in which electric energy is supplied from the capacitor 128, and furthermore, the particles 71 can migrate at a high speed.

In addition, since the active matrix circuit substrate 100 according to the present embodiment includes the first switch circuit 126 and the second switch circuit 127 which are formed as described above, the following effects are further obtained.

That is, in the first switch circuit 126, even in a case where a signal of a low voltage is used as the first control signal $\phi 1$ supplied from the first control line 115, supply of the drive signal Vpix(L) is controlled by the first control signal $\phi 1$ and thereby the drive signal Vpix(L) is supplied to the pixel electrode 121, and accordingly, it is possible to generate a larger potential difference between the pixel electrode 121 and the common electrode 202.

In the same manner, in the second switch circuit 127, even in a case where the signal of a low voltage is used as the second control signal $\phi 2$ supplied from the second control line 116, supply of the drive signal Vpix(H) is controlled by the second control signal $\phi 2$, and thereby, the drive signal Vpix(H) is supplied to the pixel electrode 121, and accordingly, it is possible to generate a larger potential difference between the pixel electrode 121 and the common electrode 202.

As described above, it is possible to increase migration speed of the particles 71 while reducing power consumption.

In addition, the first switch circuit 126 and the second switch circuit 127 are be switched to be exclusively turned on or off on the basis of the image data supplied to each gate electrode of the second P-type MOS transistor 1262 and the second N-type MOS transistor 1272, and can also be switched to be turned on or off by the first control signal $\phi 1$ and the second control signal $\phi 2$. Accordingly, operations of the first switch circuit 126 and the second switch circuit 127 are easily controlled, and thereby, signals supplied to the pixel electrode 121 and the capacitor 128 are easily controlled.

In addition, the first control signal $\phi 1$ and the second control signal $\phi 2$ can be independently supplied to the aforementioned common potential signal Vcom.

Accordingly, it is possible to operate the first switch circuit 126 and the second switch circuit 127 independently from a waveform of the common potential signal Vcom. Even from this point of view, signals supplied to the pixel electrode 121 and the capacitor 128 are easily controlled.

Second Embodiment

Next, a second embodiment of the invention will be described.

Figure 5:
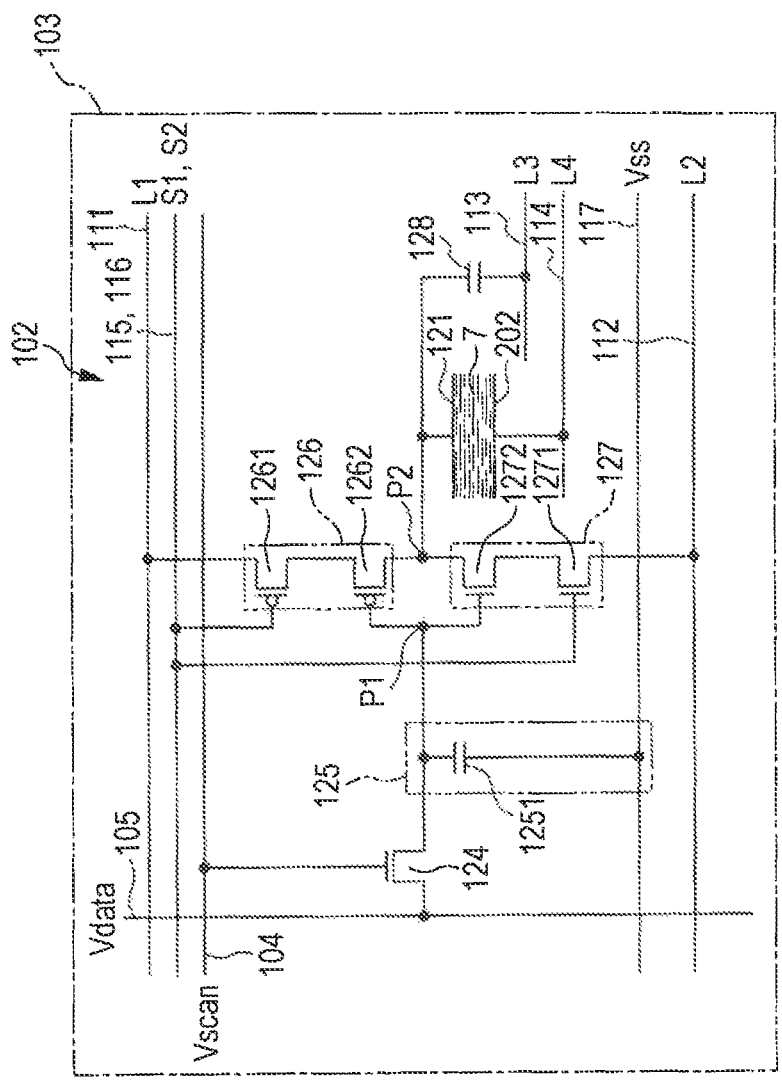
FIG. 5 is a block diagram illustrating a second embodiment of the active matrix circuit substrate according to the invention.

FIG. 5 is a block diagram illustrating a second embodiment of the active matrix circuit substrate according to the invention. FIG. 5 is a diagram illustrating a circuit configuration of one pixel.

Hereinafter, the second embodiment will be described, but in the following description, differences from the first embodiment will be mainly described, and description on the same matters will be omitted. The same symbols or reference numerals will be attached to the same configurations as in the first embodiment described above.

An active matrix circuit substrate 100 according to the present embodiment is the same as in the first embodiment, except that the first control line 115 (S1) and the second control line 116 (S2) are shared. That is, in the active matrix circuit substrate 100 of FIG. 5, a wire corresponding to the second control line 116 in FIG. 3 is omitted, while a wire corresponding to the first control line 115 in FIG. 3 shares with the first control line 115 and the second control line 116. Thereby, since one wire can be the first control line 115 and the second control line 116, the number of wires can be reduced, and wiring of the active matrix circuit substrate 100 can be simplified.

In addition, a gate electrode of the first N-type MOS transistor 1271 included in the second switch circuit 127 is connected to a shared line of the first control line 115 and the second control line 116.

Next, a method of driving the electrophoretic display device including the active matrix circuit substrate 100 illustrated in FIG. 5 (a method of driving the display device according to the second embodiment) will be described.

Figure 6:
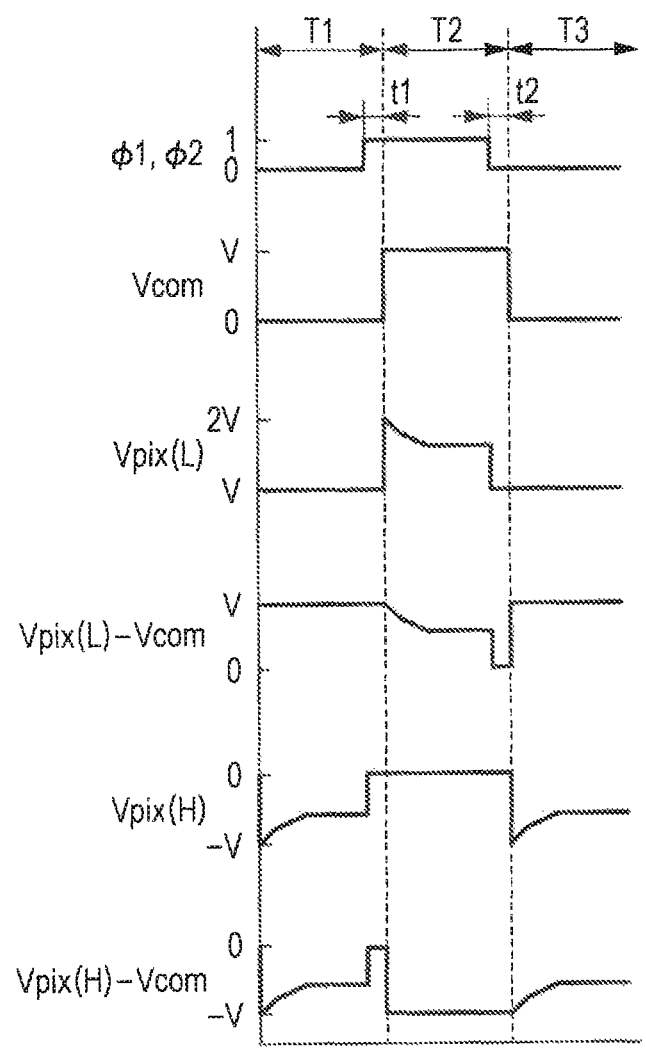
FIG. 6 is a timing chart illustrating a second embodiment of the method of driving the display device according to the invention.

FIG. 6 is a timing chart illustrating the second embodiment of the method of driving the display device according to the invention.

As illustrated in FIG. 6, the driving method according to the present embodiment is the same as the first embodiment, except that the first control signal φ1 and the second control signal φ2 are signals having the same waveform.

First, a flow of a signal will be described for a case where the image data d is "0".

In a case where the image data d is "0", the first control signal φ1 and the second control signal φ2 change to a high level (1 in FIG. 6) before the common potential signal Vcom changes from 0 [V] to V (transition from the period T1 to the period T2 occurs). Thereby, since both the first switch circuit 126 and the second switch circuit 127 are in a turn-off state, the drive signal Vpix(L) of the pixel electrode 121 is pulled up by the capacitor 128, becomes 2 V as illustrated in FIG. 6, and thereafter, gradually decreases.

Next, before the common potential signal Vcom changes from V to 0 [V] (transition from the period T2 to the period T3 occurs), the first control signal φ1 and the second control signal φ2 change to a low level. Thereby, the first switch circuit 126 enters a turn-on state. Thereby, as illustrated in FIG. 6, the drive signal Vpix(L) decreases to the potential V. At this moment, since a potential of the common electrode 202 is V, a potential difference Vpix(L)−Vcom between the pixel electrode 121 and the common electrode 202 momentarily decreases to 0 [V] as illustrated in FIG. 6.

Thereafter, if a transition to the period T3 occurs, the common potential signal Vcom becomes V in accordance with the change of the first control signal φ1 and the second control signal φ2, and thereby, the potential difference Vpix(L)−Vcom between the pixel electrode 121 and the common electrode 202 becomes V (pixel electrode 121 side is a high potential side) as illustrated in FIG. 6.

Subsequently, a flow of a signal will be described for a case where the image data d is "1".

In the case where the image data d is "1", the first control signal φ1 and the second control signal φ2 change to a low level before the common potential signal Vcom changes from V to 0 [V] (transition from the period T2 to the period T3 occurs). Thereby, since both the first switch circuit 126 and the second switch circuit 127 are in a turn-off state, the drive signal Vpix(H) of the pixel electrode 121 is pulled down by the capacitor 128, becomes −V as illustrated in FIG. 6, and thereafter, gradually increases.

Next, before the common potential signal Vcom changes from 0 [V] to V (transition from the period T1 to the period T2 occurs), the first control signal φ1 and the second control signal φ2 change to a high level. Thereby, the second switch circuit 127 enters a turn-on state. Thereby, the drive signal Vpix(H) illustrated in FIG. 6 increases to the potential 0 [V]. At this moment, since a potential of the common electrode 202 is 0 [V], a potential difference Vpix(H)−Vcom between the pixel electrode 121 and the common electrode 202 momentarily decreases to 0 [V] as illustrated in FIG. 6.

Thereafter, if a transition to the period T2 occurs, the common potential signal Vcom becomes V in accordance with the change of the first control signal φ1 and the second control signal φ2, and thereby, the potential difference Vpix(H)−Vcom between the pixel electrode 121 and the common electrode 202 becomes V (pixel electrode 121 side is a high potential side) as illustrated in FIG. 6.

As described above, according to the present embodiment, although there is a period in which the potential difference becomes zero for a moment between the pixel electrode 121 and the common electrode 202, it is possible to maintain a potential difference larger than zero during most periods. Thereby, it is possible to reduce a period during which particles 71 do not migrate. Accordingly, the electrophoretic display device 1 is obtained which can reduce the time required for migration of the particles 71 and perform display switching in a shorter time although a voltage applied between the pixel electrode 121 and the common electrode 202 does not increase. In addition, in contrast, it is possible to lower the voltage applied between the pixel electrode 121 and the common electrode 202 without increasing the time required for display switching, and thereby, power consumption of the electrophoretic display device 1 can be reduced.

The same effect as in the first embodiment is also obtained in the second embodiment.

Third Embodiment

Next, a third embodiment according to the invention will be described.

Figure 7:
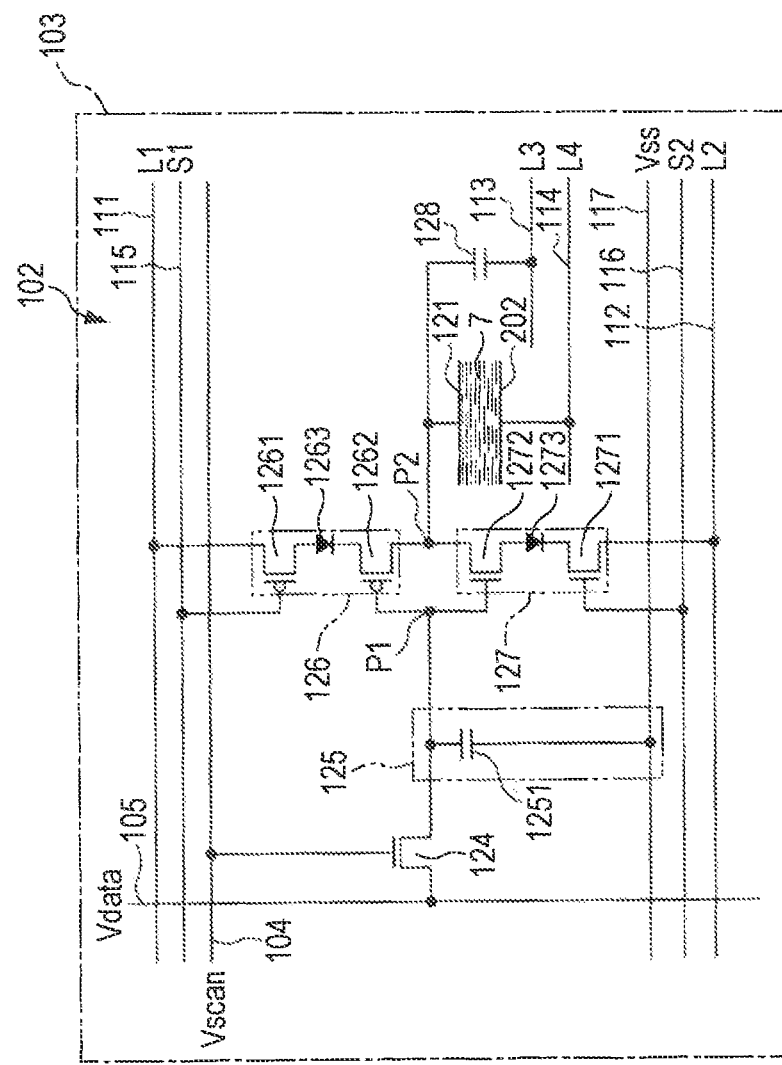
FIG. 7 is a block diagram illustrating a third embodiment of the active matrix circuit substrate according to the invention.

FIG. 7 is a block diagram illustrating the third embodiment of the active matrix circuit substrate according to the invention. FIG. 7 is a diagram illustrating a circuit configuration of one pixel.

Hereinafter, the third embodiment will be described, but in the following description, differences from the first and second embodiments will be mainly described, and description on the same matters will be omitted. The same symbols or reference numerals will be attached to the same configurations as in the first and second embodiments described above.

The third embodiment is the same as the first and second embodiments, except that the first switch circuit 126 and the second switch circuit 127 include diodes 1263 and 1273 as circuits preventing a current from flowing in reverse.

That is, in each of the first and second embodiments, a period exists during which the drive signal Vpix(L) of the pixel electrode 121 becomes 2V. Since a potential of the pixel electrode 121 is higher than a potential of the first power supply line 111 during this period, in a case where the first switch circuit 126 is in a turn-on state, there is a possibility that a current flows in reverse in the first switch circuit 126.

In the same manner, a period exists during which the drive signal Vpix(H) of the pixel electrode 121 becomes −V in each of the first and second embodiments. Since a potential of the second power supply line 112 is higher than a potential of the pixel electrode 121 during this period, in a case where the second switch circuit 127 is in a turn-on state, there is a possibility that a current flows in reverse in the second switch circuit 127.

If the current flows in reverse, there is a possibility that the first switch circuit 126 or the second switch circuit 127 is damaged.

Therefore, the first switch circuit 126 includes the diode 1263, and the second switch circuit 127 includes the diode 1273, in the third embodiment, as described above. Thereby, although the first switch circuit 126 or the second switch circuit 127 is in a turn-on state during the aforementioned period, it is possible to prevent the current from flowing in reverse to prevent the damage from occurring. Accordingly, the active matrix circuit substrate 100 with higher reliability and the electrophoretic display device with higher reliability are obtained.

The circuit which prevents the current from flowing in reverse is not limited to a diode, and may be a circuit with another configuration.

In addition, a position where the circuit that prevents the current from flowing in reverse is provided is not limited to being located between the first P-type MOS transistor 1261 and the second P-type MOS transistor 1262 and between the first N-type MOS transistor 1271 and the second N-type MOS transistor 1272, as illustrated in FIG. 7. For example, the position may be located between the second P-type MOS transistor 1262 and the common output terminal P2 and between the second N-type MOS transistor 1272 and the common output terminal P2.

In addition, it is preferable that both the first switch circuit 126 and the second switch circuit 127 respectively include a circuit which prevents the current from flowing in reverse as described above, but it is not necessary for both to include the circuit. That is, at least one of the first switch circuit 126 and the second switch circuit 127 may include the circuit which prevents the current from flowing in reverse. Also in this case, it is possible to prevent at least one of the switch circuits from being damaged.

Also in the third embodiment, the same effects as in the first and second embodiments are obtained.

Fourth Embodiment

Next, a fourth embodiment according to the invention will be described.

Figure 8:
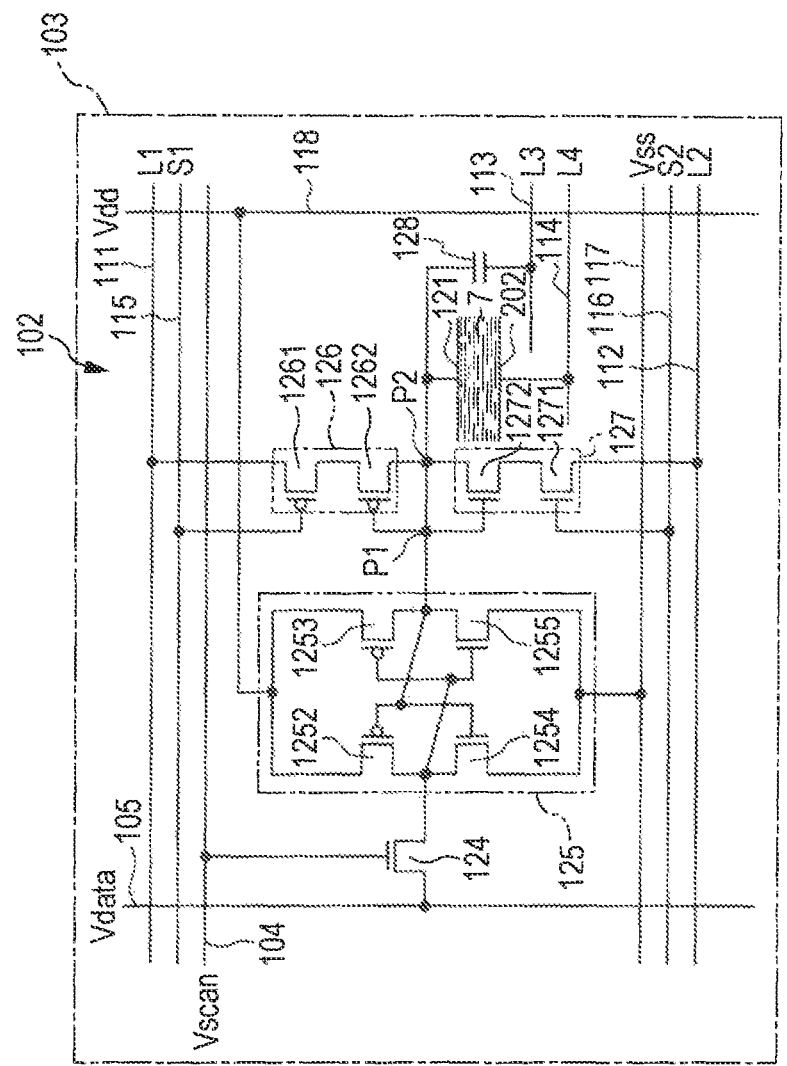
FIG. 8 is a block diagram illustrating a fourth embodiment of the active matrix circuit substrate according to the invention.

FIG. 8 is a block diagram illustrating the fourth embodiment of the active matrix circuit substrate according to the invention. FIG. 8 is a diagram illustrating a circuit configuration of one pixel.

Hereinafter, the fourth embodiment will be described, but in the following description, differences from the first to third embodiments will be mainly described, and description on the same matters will be omitted. The same symbols or reference numerals will be attached to the same configurations as in the first to third embodiments described above.

The fourth embodiment is the same as the first embodiment, except that wires and a circuit configuration of the memory circuit 125 are different.

That is, a high potential line 118 is further disposed in the pixel 102 according to the fourth embodiment.

The high potential line 118 supplies a potential signal on the high potential side to the memory circuit 125.

The memory circuit 125 illustrated in FIG. 8 is a complementary metal oxide semiconductor (CMOS) type static random access memory (SRAM) including two P-type MOS transistors 1252 and 1253 and two N-type MOS transistors 1254 and 1255.

A source electrode of the P-type MOS transistor 1252 is connected to the high potential line 118, a drain electrode thereof is connected to the drain electrode of the drive TFT 124, and a gate electrode thereof is connected to a gate electrode of the N-type MOS transistor 1254. In addition, a source electrode of the P-type MOS transistor 1253 is connected to the high potential line 118, a drain electrode thereof is connected to the common input terminal P1 of the first switch circuit 126 and the second switch circuit 127, and a gate electrode thereof is connected to a gate electrode of the N-type MOS transistor 1255.

A source electrode of the N-type MOS transistor 1254 is connected to the constant potential line 117, a drain electrode thereof is connected to the drain electrode of the drive TFT 124, and the gate electrode thereof is connected to the gate electrode of the P-type MOS transistor 1252. A source electrode of the N-type MOS transistor 1255 is connected to the constant potential line 117, a drain electrode thereof is connected to the common input terminal P1 of the first switch circuit 126 and the second switch circuit 127, and the gate electrode thereof is connected to the gate electrode of the P-type MOS transistor 1253.

The drain electrode of the P-type MOS transistor 1252 and the drain electrode of the N-type MOS transistor 1254 are connected to the gate electrode of the P-type MOS transistor 1253 and the gate electrode of the N-type MOS transistor 1255.

Furthermore, the gate electrode of the P-type MOS transistor 1252 and the gate electrode of the N-type MOS transistor 1254 are connected to the drain electrode of the P-type MOS transistor 1253 and the drain electrode of the N-type MOS transistor 1255.

Also in the fourth embodiment, the same effects as in the first to third embodiments are obtained.

Fifth Embodiment

Next, a fifth embodiment according to the invention will be described.

Figure 9:
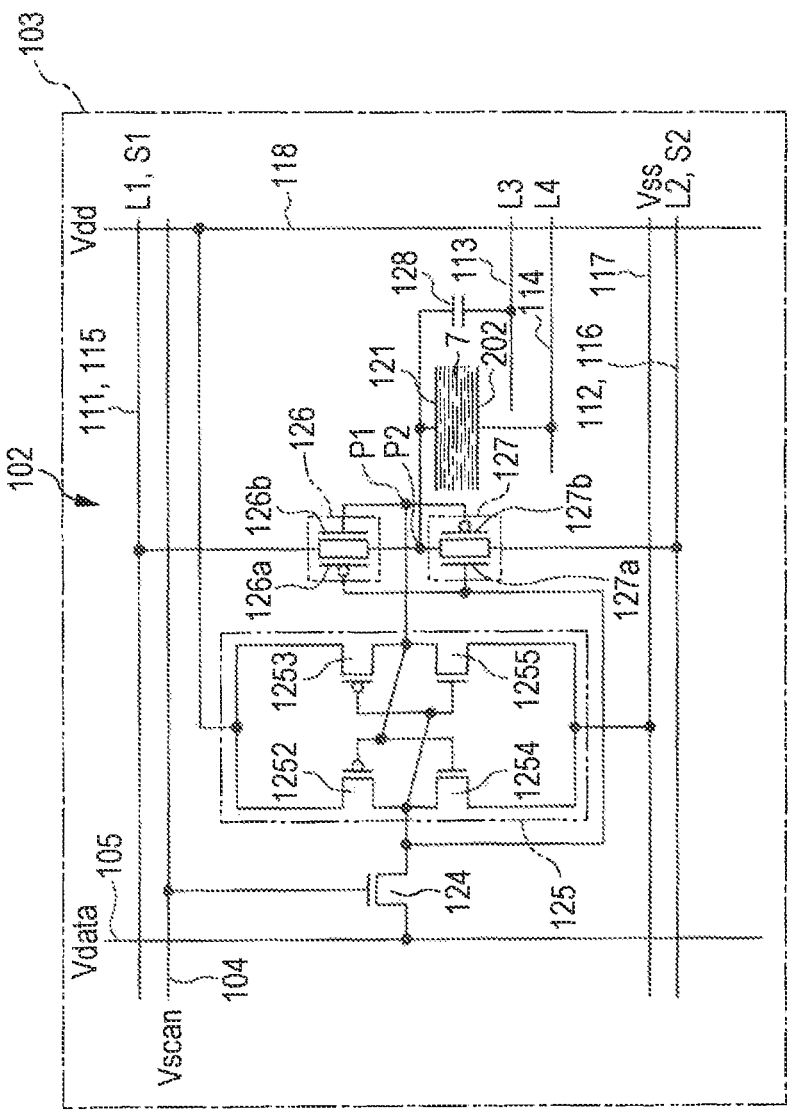
FIG. 9 is a block diagram illustrating a fifth embodiment of the active matrix circuit substrate according to the invention.
Figure 10:
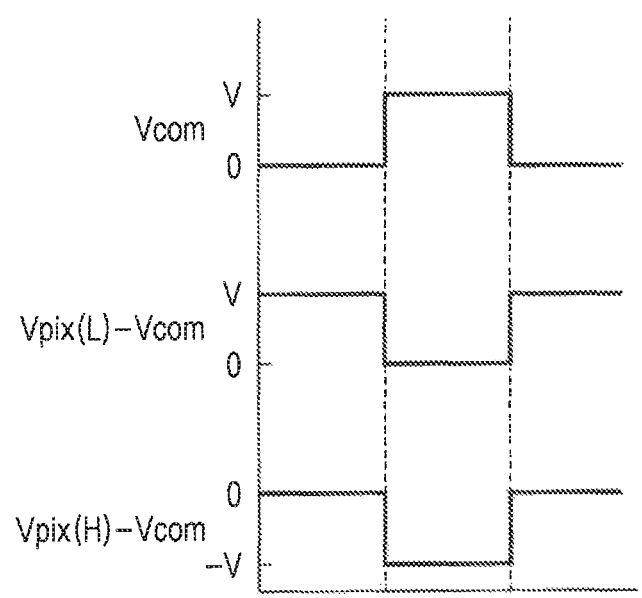
FIG. 10 is a timing chart illustrating a drive sequence of an electrophoretic display device in the related art.

FIG. 9 is a block diagram illustrating the fifth embodiment of the active matrix circuit substrate according to the invention. FIG. 9 is a diagram illustrating a circuit configuration of one pixel.

Hereinafter, the fifth embodiment will be described, but in the following description, differences from the first to fourth embodiments will be mainly described, and description on the same matters will be omitted. The same symbols or reference numerals will be attached to the same configurations as in the first to fourth embodiments described above.

The fifth embodiment is the same as the fourth embodiment, except that circuit configurations of the first switch circuit 126 and the second switch circuit 127 are different.

That is, the first switch circuit 126 and the second switch circuit 127 illustrated in FIG. 9 are each formed of a transfer gate.

Specifically, the first switch circuit 126 includes a P-type MOS transistor 126a and an N-type MOS transistor 126b. Among these, a source electrode of the P-type MOS transistor 126a is connected to the first power supply line 111 which shares the first control line 115, a drain electrode thereof is connected to the pixel electrode 121, and a gate electrode thereof is connected to the drain electrode of the drive TFT 124.

In addition, a source electrode of the N-type MOS transistor 126b is connected to the first power supply line 111 which shares the first control line 115, a drain electrode thereof is connected to the pixel electrode 121, and a gate electrode thereof is connected to an output terminal of the memory circuit 125.

Meanwhile, the second switch circuit 127 includes an N-type MOS transistor 127a and a P-type MOS transistor 127b. Among these, a source electrode of the N-type MOS transistor 127a is connected to the second power supply line 112 which shares the second control line 116, a drain electrode thereof is connected to the pixel electrode 121, and a gate electrode thereof is connected to the drain electrode of the drive TFT 124.

In addition, a source electrode of the P-type MOS transistor 127b is connected to the second power supply line 112 which shares the second control line 116, a drain electrode thereof is connected to the pixel electrode 121, and a gate electrode thereof is connected to the output terminal of the memory circuit 125.

Also in the fifth embodiment, the same effects as in the first to fourth embodiments are obtained.

In addition, in the fifth embodiment, a drive signal supplied from the first power supply line 111 and a drive signal supplied from the second power supply line 112 may be periodically exchanged as necessary. That is, although the exchange operation is performed, the display is not affected. In addition to this, it is possible to suppress adverse effects caused by a continuous flow of the current in a certain direction, for example, occurrence of adverse effects such as deterioration of the characteristics of a semiconductor material.

Electronic Apparatus

Next, an embodiment of an electronic apparatus according to the invention will be described. The electronic apparatus according to the present embodiment includes the display device according to the aforementioned embodiment.

Figure 11:
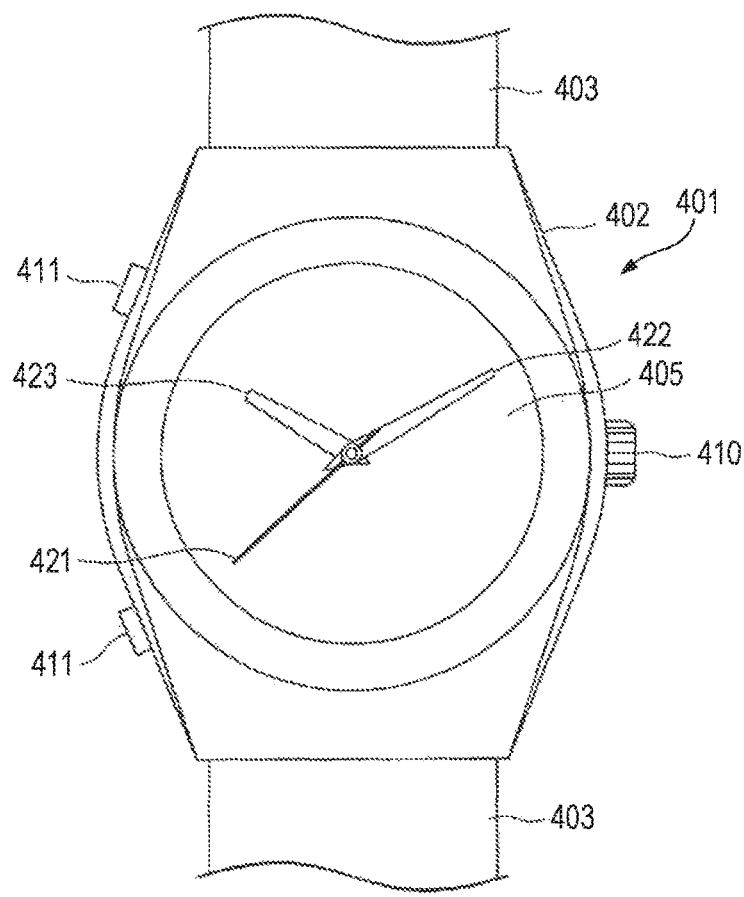
FIG. 11 is a front view of a wristwatch to which an embodiment of an electronic apparatus according to the invention is applied.

FIG. 11 is a front view of a wristwatch to which the embodiment of the electronic apparatus according to the invention is applied.

A wristwatch 401 (an embodiment of the electronic apparatus according to the invention) illustrated in FIG. 11 includes a watch case 402 and a pair of bands 403 connected to the watch case 402. An electrophoretic display device 405 (an embodiment of a display device according to the invention), a second hand 421, a minute hand 422, and an hour hand 423 are provided on a front surface of the watch case 402. A winding knob 410 as an operating element and an operation button 411 are provided on s side surface of the watch case 402.

Figure 12:
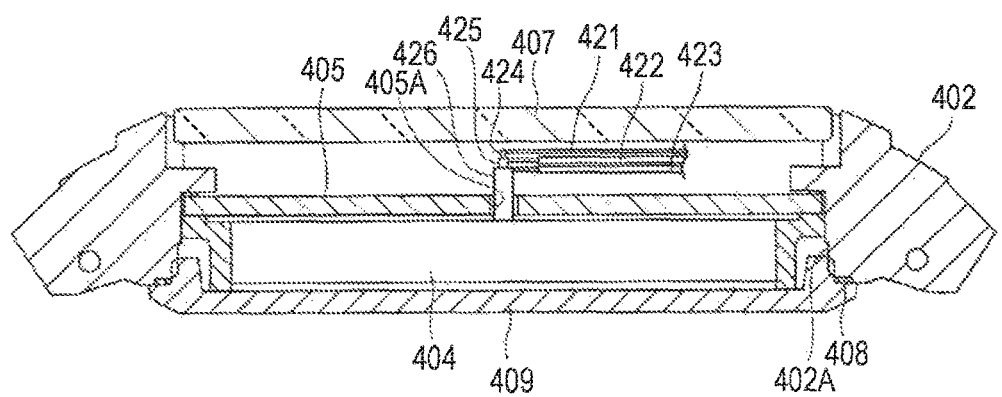
FIG. 12 is a side sectional view of the wristwatch illustrated in FIG. 11.

FIG. 12 is a side sectional view of the wristwatch illustrated in FIG. 11.

An accommodation portion 402A is provided inside the watch case 402 illustrated in FIG. 12. A movement 404 and an electrophoretic display device 405 are accommodated in the accommodation portion 402A. A transparent cover 407 formed of glass or resin is provided on one end side (a front side of the watch) of the accommodation portion 402A. A back lid 409 is screwed via a packing 408 on the other end side (a rear side of the watch) of the accommodation portion 402A, and the watch case 402 is sealed by the back lid 409 and the transparent cover 407.

The movement 404 includes a movement hand mechanism (not illustrated) to which an analog pointer formed of the second hand 421, the minute hand 422, and the hour hand 423 is connected. The movement hand mechanism rotatably drives the analog pointer and functions as a time display unit which displays the set time.

The electrophoretic display device 405 is disposed on a front side of the watch of the movement 404 and forms a display unit of the wristwatch 401. A display surface of the electrophoretic display device 405 has a circular shape here, but, may have another shape such as a regular octagonal shape or a hexadecagonal shape. A via hole 405A penetrating front and back surfaces of the electrophoretic display device 405 is formed in a central portion of the electrophoretic display device 405. The respective axes of a second wheel 424, the second wheel 425, and an hour wheel 426 of the movement hand mechanism (not illustrated) of the movement 404 are inserted in the via hole 405A. Each of the second hand 421, the minute hand 422, and the hour hand 423 is attached to a front end of each shaft.

The electronic apparatus according to the invention is also applied to a device other than the watch.

Figure 13:
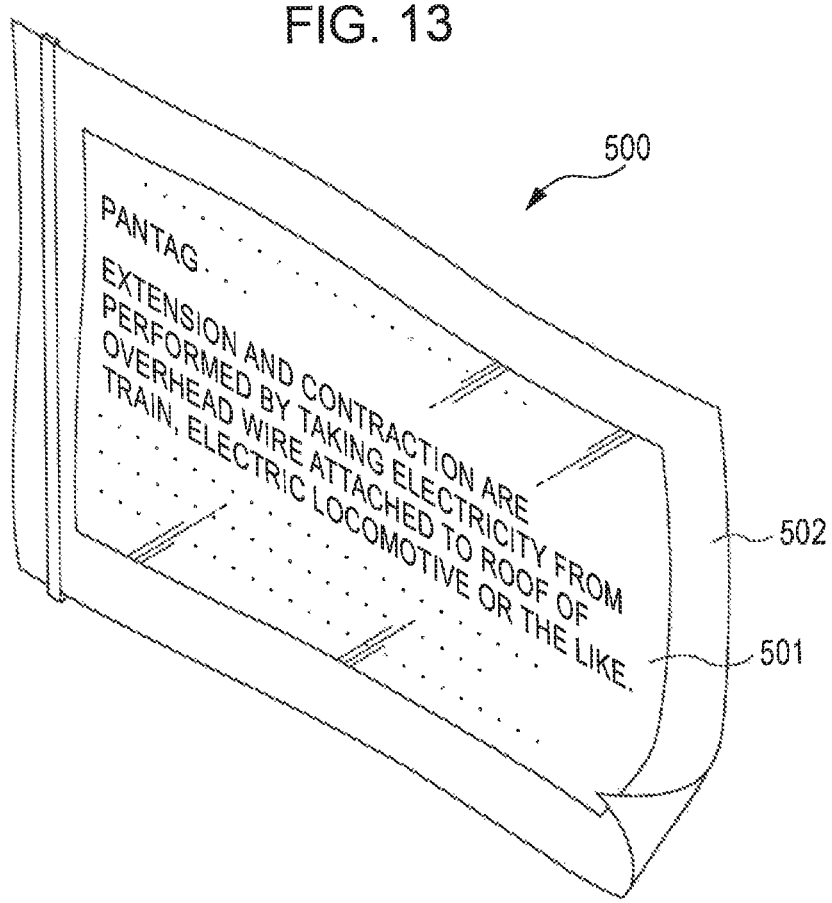
FIG. 13 is a perspective view illustrating a configuration of electronic paper to which the embodiment of the electronic apparatus according to the invention is applied.

FIG. 13 is a perspective view illustrating a configuration of electronic paper to which the embodiment of the electronic apparatus according to the invention is applied.

The electronic paper 500 illustrated in FIG. 13 includes a display unit 501 (an embodiment of the display device according to the invention). The electronic paper 500 includes a main body 502 formed of a rewritable sheet that is flexible and has the same texture and softness as the paper of the related art.

Figure 14:
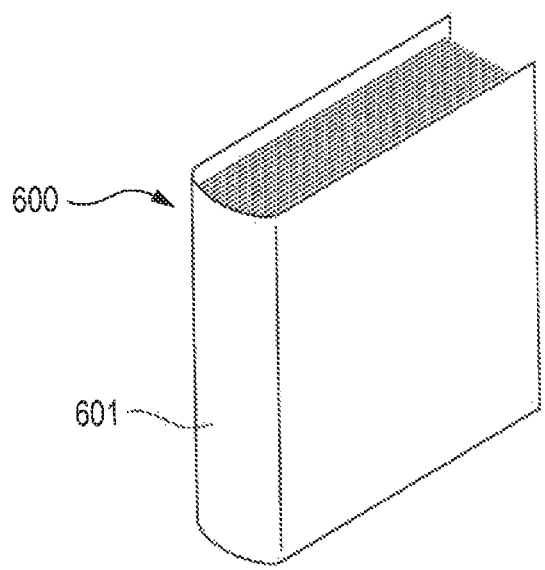
FIG. 14 is a perspective view illustrating a configuration of an electronic notebook to which the embodiment of the electronic apparatus according to the invention is applied.

FIG. 14 is a perspective view illustrating a configuration of an electronic notebook to which the embodiment of the electronic apparatus according to the invention is applied.

The electronic notebook 600 illustrated in FIG. 14 is formed by bundling a plurality of electronic papers 500 illustrated in FIG. 13 and is interposed between covers 601. The cover 601 includes display data input means (not illustrated) which receives display data transferred from, for example, an external device. Thereby, it is possible to change or update display contents according to the display data, in a state where the electronic papers are bundled.

The aforementioned electronic apparatuses such as the wristwatch 401, the electronic paper 500, and the electronic notebook 600 include the display device according to the invention, thereby, being able to obtain effects caused by the active matrix circuit substrate 100, and thus, a display switching speed increases.

As such, the active matrix circuit substrate, the display device, the method of driving the display device, and the electronic apparatus according to the invention are described on the basis of the illustrated embodiments, but the invention is not limited to this.

For example, in the active matrix circuit substrate, the display device, and the electronic apparatus, the configuration of each unit can be replaced with an arbitrary configuration having the same function, and any other arbitrary configuration can also be added thereto. Specifically, the memory circuit, the switch circuit, the capacitor, the diode, or the like can be replaced with a circuit, an element, or the like having the same function.

In addition, the method of driving the display device may be a method in which a process with an arbitrary purpose is added to the above embodiment.

In addition, the display device to which the active matrix circuit substrate can be applied is not limited to the electrophoretic display device, and may be another display device which performs display switching by driving a display medium using an electric field.

The entire disclosure of Japanese Patent Application No. 2016-158136, filed Aug. 10, 2016 is expressly incorporated by reference herein.

What is claimed is:

1. An active matrix circuit substrate comprising:
   a first power supply line, a second power supply line, a third power supply line, a fourth power supply line, a first control line, and a second control line;
   a pixel electrode and a memory circuit that are provided in correspondence with a pixel;
   a common electrode that is electrically connected to the fourth power supply line;
   a capacitor that is provided between the third power supply line and the pixel electrode;
   a first switch circuit that is provided between the first power supply line and the pixel electrode and operates on the basis of an output of the memory circuit and a potential of the first control line; and a second switch circuit that is provided between the second power supply line and the pixel electrode and operates on the basis of the output of the memory circuit and a potential of the second control line;

wherein the first switch circuit includes a first P-type transistor and a second P-type transistor that are connected in series to each other, and the second switch circuit includes a first N-type transistor and a second N-type transistor that are connected in series to each other.

2. The active matrix circuit substrate according to claim 1, wherein the first control line and the second control line are one and the same.

3. The active matrix circuit substrate according to claim 1, wherein at least one of the first switch circuit and the second switch circuit includes a circuit that prevents a current from flowing in reverse.

4. The active matrix circuit substrate according to claim 1, wherein the third power supply line and the fourth power supply line are one and the same.

5. The active matrix circuit substrate according to claim 1, further comprising:
a scan line;
a data line; and
a pixel switching element that is provided in correspondence with the pixel and is provided between the scan line, the data line, and the memory circuit.

6. A display device comprising:
the active matrix circuit substrate according to claim 1; and
an electro-optical material layer that is provided between the pixel electrode and the common electrode.

7. A display device comprising:
the active matrix circuit substrate according to claim 2; and
an electro-optical material layer that is provided between a pixel electrode and a common electrode.

8. A display device comprising:
the active matrix circuit substrate according to claim 3; and
an electro-optical material layer that is provided between a pixel electrode and a common electrode.

9. A display device comprising:
the active matrix circuit substrate according to claim 4; and
an electro-optical material layer that is provided between a pixel electrode and a common electrode.

10. A display device comprising:
the active matrix circuit substrate according to claim 5; and
an electro-optical material layer that is provided between a pixel electrode and a common electrode.

11. A method of driving the display device according to claim 6, the method comprising:
causing the first switch circuit or the second switch circuit to be in a turn-off state before potentials change, when a potential of the third power supply line and a potential of the fourth power supply line change into the same phase.

12. A method of driving the display device according to claim 7, the method comprising:
causing the first switch circuit or the second switch circuit to be in a turn-off state before potentials change when a potential of the third power supply line and a potential of the fourth power supply line change into the same phase.

13. A method of driving the display device according to claim 8, the method comprising:
causing the first switch circuit or the second switch circuit to be in a turn-off state before potentials change, when a potential of the third power supply line and a potential of the fourth power supply line change into the same phase.

14. A method of driving the display device according to claim 9, the method comprising:
causing the first switch circuit or the second switch circuit to be in a turn-off state before potentials change, when a potential of the third power supply line and a potential of the fourth power supply line change into the same phase.

15. A method of driving the display device according to claim 10, the method comprising:
causing the first switch circuit or the second switch circuit to be in a turn-off state before potentials change, when a potential of the third power supply line and a potential of the fourth power supply line change into the same phase.

16. An electronic apparatus comprising: the display device according to claim 6.

17. An electronic apparatus comprising: the display device according to claim 7.

* * * * *